United States Patent [19]

Stoller

[11] 4,079,543

[45] Mar. 21, 1978

[54] SYNTHETIC CASINGS FOR MUSHROOM BEDS

[76] Inventor: Benjamin B. Stoller, P.O. Box 1339, Santa Cruz, Calif. 95060

[21] Appl. No.: 783,667

[22] Filed: Apr. 1, 1977

[51] Int. Cl.² .......................... C05G 1/00; A01G 1/04
[52] U.S. Cl. ....................................................... 47/1.1
[58] Field of Search ................................. 47/1.1; 71/5

[56] References Cited

U.S. PATENT DOCUMENTS 3,828,470   8/1974   Stoller ..................................... 47/1.1

Primary Examiner—Robert E. Bagwill
Attorney, Agent, or Firm—Robert G. Slick

[57] ABSTRACT

A synthetic casing for mushroom beds in order to grow mushrooms is provided by a formulation consisting of a water absorptive material such as shredded newspaper, powdered activated carbon, water, limestone and gypsum.

3 Claims, No Drawings

SYNTHETIC CASINGS FOR MUSHROOM BEDS

SUMMARY OF THE PRIOR ART

In the past, activated carbon has been employed as part of a laboratory medium for fast spawn (mycelial) growth in the preparation of mushroom spawn as is set forth in the inventor's book, "Science and Practice of Mushroom Growing", pages 238 and 239, 1971. The primordia (initials for sporophores or mushrooms) growing on this autoclaved laboratory medium indicated that activated carbon might be useful in a casing for sporophore production. Activated carbon also was found useful as a constituent of a growing medium for mushroom spawn as set forth in the inventor's prior U.S. Pat. No. 3,828,470. In order to employ these media with activated carbon, it was required to sterilize these media by heating to approximately 250° F. The present invention differs from the prior act primarily in the use of a water absorptive material, such as shredded newspaper and the use of a substantial amount of activated carbon as a casing material, without the need for sterilizing.

SUMMARY OF THE INVENTION

In growing mushrooms it is a universal practice to "case" the beds by placing a layer of material over the mushroom bed after the spawn has permeated the compost. This casing layer is usually one to two inches thick, and originally was loam soil. In 1947 I discovered that peat could be substituted for this loam soil. I described my experiments and commercial practice in my articles, "Studies on the Function of the Casing for Mushroom Beds", Part I, Part II and Part III in the October, 1952, November, 1952 and December, 1952 issues of the Mushroom Growers' Association Bulletin, published in London, England. Other materials such as vermiculite, gravel, crushed brick and ashes have also been proposed.

The purpose or function of the casing material is to provide a medium which is insufficient in nutrients so that the mycelium growing into the casing is unable to form the polyphenol oxidase enzymes, which in turn produce the quinones that prevent fruiting. (The quinones are useful to the mushroom as a defensive mechanism, but must be destroyed in order to induce fruiting). The alkalinity and reducing substances occuring in the casing also serve to destroy these quinone inhibitors volatilizing into the casing. The casing also serves as an additional source of moisture.

At the present time peat is widely used for casing mushroom beds, but peat reserves suitable for casing mushroom beds are now being depleted. Also, the cost of baling and transporting peat is becoming expensive so that it would be highly desirable to provide a relatively inexpensive substitute for the peat.

Although various synthetic casings for mushroom beds have been proposed, none have produced the large yields to compete with peat, or have been too expensive to have any practical application. In the formulas for a synthetic casing to be presented, I have discovered how to make a practical formula for commercial practice and a formula which will produce yields even higher than those obtainable with peat.

In accordance with the present invention, an inexpensive material that is highly absorptive to water is combined with activated carbon to adsorb, remove or destroy emanations derived from mycelium that prevent fructification.

In addition, a casing material is provided which in some embodiments produces a much higher yield of mushrooms than can be obtained with conventional casing materials.

Various other features and advantages of the invention will be brought out in the balance of the specification.

DESCRIPTION OF THE PREFERRED EMBODIMENTS

In accordance with the present invention, a material which is highly absorptive to water, preferably shredded newspaper, is combined with water, activated carbon, and limestone to provide the basic casing material. The limestone should be in a granular form to prevent stickiness. In addition, gypsum provides a useful diluent for the powdered activated carbon.

The shredded newspaper or other discarded, highly absorptive paper may be any length, although usually the length of the newspaper sheet. The width cut by most shredders is onequarter inch but the width may be varied for increased porosity and water-absorbing power.

I have found that for 125 grams of shredded newspaper, the water added to the paper may be varied from 400 milliliters (ml) to 1000 mls., but 600 to 800 mls. are preferable. I have found that the activated carbon may be varied from 2 grams to 100 grams per 125 grams of dry shredded paper; however 20 to 30 grams are preferable. The amount of activated carbon used will depend on the method of manufacture of the activated carbon and the thickness of the casing layer. The casing layer of shredded paper containing activated carbon with or without a diluent such as gypsum, may be a layer ¼ inch to one and a half (1½) inches thick. The exact amount of activated carbon used for casing to produce sporophores (mushrooms) will vary somewhat with the source from which the activated carbon was made, and also how the activated carbon was manufactured but any activated carbon can be employed.

Normally wet newspaper would ball up and also get moldy under the conditions employed in growing mushrooms. However, the granulated limestone has been found to inhibit mold growth and also prevents the material from balling up and getting mushy. Accordingly, granulated limestone is considered an essential ingredient of the formulation. Gypsum is also preferably added to the formulation but its use is not particularly necessary. The primary function of the gypsum is to make the activated carbon less dusty and easier to handle. Normally I prefer to employ about 500 grams of granular limestone (which would be coarse granular limestone about the grain size of granulated sugar) to produce a pH of the entire synthetic casing of 6.5 to 8.0, preferably 7.5, and about 45 grams gypsum. The gypsum may be omitted.

In one series of tests, mushrooms were grown in pails 10 inches deep on a horse manure compost having a surface area of approximately one-half square foot with a casing of one inch of various materials. The mushrooms are brown strain type and were picked for 20 days to determine the yield. The following casing formulations were employed with the yield shown in grams per pail.

1.

Shredded paper — 125 grams
water 400 ml
500 grams granulated limestone (pH 7.5)
Yield: 382 grams product

2.

As in 1 except that 10 grams of activated carbon (Darco S-51) were added
Yield: 638 grams

3.

As in 1 plus 20 grams activated carbon
Yield: 998 grams

4.

As in 1 except that 600 ml water was employed with 45 grams gypsum added
Yield: 634 grams

5.

As in 1 except that 600 ml water was used with 10 grams activated carbon and 350 mg vitamin B1 (Thiamine)
Yield: 844 grams

6.

As in 1 except that 600 ml water was used together with 20 grams activated carbon and 45 grams gypsum
Yield: 1128 grams

7.

Peat control
Yield: 675 grams

The above tests show that the best formulation, i.e. experiment 6, produced 66% more mushrooms than the peat control and that all of the tests wherein at least 20 grams of activated carbon was used per 125 grams of shredded paper were superior to the peat control. Although some formulations produced yields less than that of the peat control, the low cost of such casing formulations offsets the lower yields and makes them attractive from a commercial standpoint.

I claim:

1. A casing material for mushroom beds comprising about 125 grams of a water absorptive material such as shredded newspaper, about 400–1000 ml water, about 2 grams to 100 grams finely divided activated carbon and sufficient granular limestone to yield a pH of from 6.5 to 8.

2. The material of claim 1 having in addition thereto gypsum.

3. The casing material of claim 1 wherein the amount of water is from 600 to 800 mls, the activated carbon is from 20 to 30 grams and the amount of limestone is sufficient to render a material having a pH of about 7.5.

* * * * *